Aug. 16, 1932.  H. V. ATWELL  1,871,943
SEAL
Filed March 5, 1930
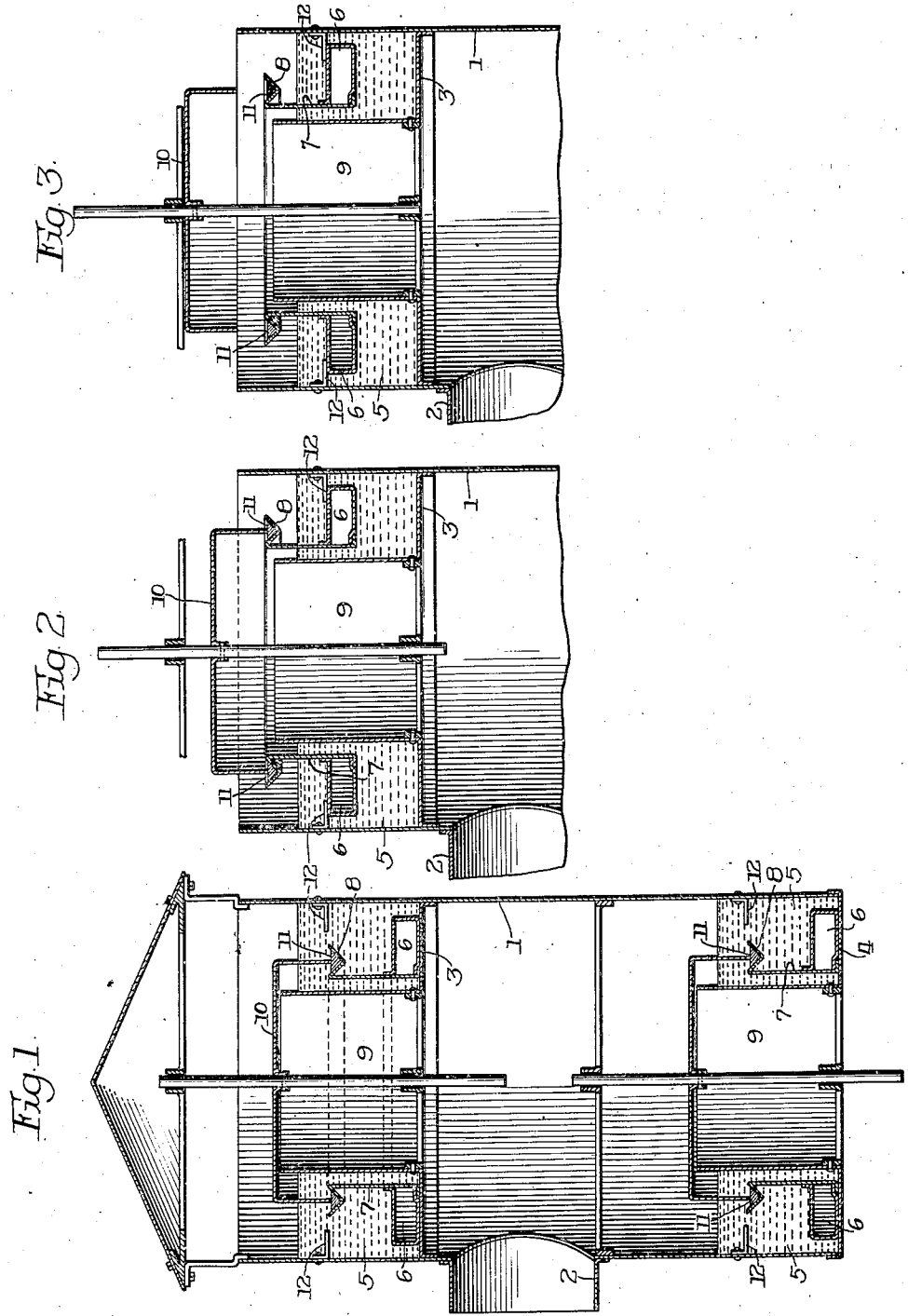
Witnesses
Stewart L. Clark.
Clarence H. Seeley.
Inventor
Harold V. Atwell Patented Aug. 16, 1932

1,871,943

UNITED STATES PATENT OFFICE

HAROLD V. ATWELL, OF HAMMOND, INDIANA, ASSIGNOR TO STANDARD OIL COMPANY (INDIANA), OF CHICAGO, ILLINOIS, A CORPORATION OF INDIANA

SEAL

Application filed March 5, 1930. Serial No. 433,449.

This invention is an improvement in liquid sealed valves such as are used for venting relatively large volumes of gas at relatively low pressures. The valves most commonly used for this service comprise a vertically movable inverted bucket or valve member, the lower edge of which dips in a body of sealing liquid surrounding a gas vent. The most common use for such valves is on storage tanks for crude petroleum and its light distillates. In such installations the lifting bucket is subjected on one side to the gas pressure within the tank and on the other side to atmospheric pressure. Two such inverted buckets are generally enclosed in a single casing, one arranged to lift out of its sealing liquid when the pressure within the tank exceeds atmospheric pressure by a predetermined value, and the other to open in a similar manner when the atmospheric pressure exceeds the tank pressure. Typical valves of this type are shown in U. S. Patent 1,585,276 granted to H. V. Atwell, May 18, 1926, and Patent 1,628,348 granted to H. V. Atwell May 10, 1927.

A common defect of these valves is that when they are open the gas passing through them tends to entrain and carry away more or less of the sealing liquid. On this account such valves must be frequently inspected and the sealing liquid replenished. Even with such inspections, it is difficult to prevent occasional "blowouts" of sealing liquid which leave the seal open and cause a considerable loss of gas. One object of my invention is to provide a liquid seal in which this defect is minimized. At the same time, I aim to provide greater sensitivity and dependability than has characterized this class of valves in the past.

My invention will be understood by reference to the accompanying drawing in which:

Figure I is a diagrammatic sectional view of a double valve arranged to vent gases both inward and outward.

Figure II is a diagram of the valve in position just before opening, and

Figure III shows the valve in the open position.

In Figure I, 1 represents a cylindrical casing with a side opening 2, which is attached by piping (not shown) to the gas space to be vented. Within the casing near the top and near the bottom are shelves and walls forming the annular troughs 3 and 4. These troughs are filled with sealing liquid 5 to the level indicated by the dotted lines. Water, oil, or some low freezing mixture such as brine or glycerine solution may be used as sealing liquid. The inner walls of the troughs constitute gas conduits 9.

Since the design of the vacuum relief member operating in the lower trough is identical in principle with that of the pressure relief member in the upper trough, only the latter will be described in detail.

Submerged in the sealing liquid 5 is the annular float 6, which may be a hollow sheet metal float or a solid ring of wood, cork or other suitable material. Attached to this float at its inner circumference is the upstanding collar 7, and attached to the top edge of this collar is an annular trough 8. This trough is preferably filled with a soft absorbent material such as felt. Along the bottom of the trough are occasional holes or slots, not shown, through which sealing liquid can drain when the trough is above the liquid level.

Over the upper end of the conduit 9 is the valve member 10 with its sides extending downward and adapted to rest evenly and continuously on the felt seat 11 when the seal is closed. Attached to the walls of the casing 1 are stops 12, positioned so as to limit the upward movement of the float 6 and keep it submerged at all times. Instead of using mechanical stops for limiting the upward movement of the float and attached seat the lower portion of the trough 3 may be filled with a liquid of greater density than the sealing liquid proper, and nonmiscible therewith. The buoyancy of float 6 is such that when relieved of the weight of valve member 10 it will rise in sealing liquid 5 and maintain the annular trough 8 above the level of the sealing liquid. The weight of valve member 10 is such that when resting on trough 8 and subjected to no pressure differential it will overcome the buoyancy of float 6 and cause trough 8 to be submerged in the sealing liquid 5.

For example, if the sealing liquid is oil, the liquid in the bottom of the trough may be a heavy aqueous solution, as of glycerine or salt. The float would then be so designed that it would rise only to the interface of the two liquids, and the depth of the lower liquid would be such that the vertical travel of the float would suffice to raise the seat 11 above the surface of the sealing liquid.

To illustrate the operation of the valve it will be assumed that it is desired to vent the tank when the pressure therein corresponds to a head of one inch of water. The net buoyancy of the float 6 and the area and weight of the cover 10 would then be adjusted so that at a pressure of approximately nine-tenths of an inch of water the floating seat and the valve member would rise to the position shown in Figure II. Here the excess of liquid would drain from the metal and felt of the exposed parts but enough liquid would be retained by the felt to insure comparatively little leakage between the edge of the valve member and its seat. Upon a further increase in pressure to the specified one inch of water, the valve member lifts completely off the seat to make a free passage for the escape of gas as in Figure III.

It is evident that except for a narrow range of pressure differential just less than that at which the valve is wide open and corresponding to the valve position shown in Figure II, this arrangement provides a perfect liquid seal. The moving parts will be in this intermediate position only at times when the escape of considerable quantities of gas through the wide open seal is imminent so that any leakage at this time is of little importance. The leakage is minimized by the use of a soft damp seat which offers the best possible opportunity for a tight joint even when the valve member is resting on it lightly. However, gas escaping from the seal in this position or in the position of Figure III cannot cause the loss of liquid by entrainment because no free liquid is in or adjacent to the path of the flowing gas. This is a very important improvement over previous liquid seal valves where the gas may actually bubble through the sealing liquid just before the valve member lifts completely.

Another important advantage results from the frequent immersion of the seat of my valve, in that scale, dust, and other foreign matter deposited thereon by the gas stream is washed off. Thus the possibility of the valve member becoming stuck to its seat by corrosion or by the accumulation of sediment is much less than in the case of old style liquid sealed valves or mechanical valves.

The above description of floats to effect the vertical motion of the valve seat is given for purposes of illustration only. It is obvious that a counterweight system could be arranged for each valve seat to have an effect equivalent to that of the floats; or that the motion of the valve member itself might operate through a mechanical linkage to raise and lower the seat; or that an auxiliary diaphragm subjected to the same pressure which acts on the valve member could be used to impart the desired motion to the seat. It is also within the scope of my invention to apply these or equivalent expedients to other types of liquid sealed valves such as the so-called tilting liquid seal described in U. S. Patent 1,628,348 granted to me on May 10, 1928.

I claim as my invention:

1. In a liquid sealed gas relief valve a vertically movable valve seat and means for moving said seat through the sealing liquid in response to changes in pressure within the valve.

2. In a liquid sealed gas relief valve, a vertically movable valve seat and means to cause the seat to emerge from the liquid before the valve lifts from the seat.

3. In a liquid sealed gas relief valve a vertically movable valve seat and valve member, and means whereby a pressure differential less than that required to lift the valve member from the seat will allow the seat to rise out of the liquid.

4. In a liquid sealed gas relief valve a vertically movable seat for the valve member; a float attached to said seat; a liquid exerting a buoyant force on said float sufficient to sustain said seat above the surface of the sealing liquid when not depressed therein by the weight of said valve member.

5. In a liquid sealed gas relief valve as described in claim 2, a valve seat of absorbent material.

6. In a liquid sealed gas relief valve as described in claim 2, means for draining the surplus liquid from the seat after it has emerged from the body of sealing liquid.

7. A liquid sealed gas relief valve having a valve seat of absorbent material saturated with the sealing liquid.

8. A liquid sealed gas relief valve having a vertically movable valve seat of absorbent material.

9. A gas relief valve having an upright gas conduit, a body of liquid surrounding the lower end of the conduit, a vertically movable valve member enclosing the upper end of the conduit and having sides which extend downwardly into said body of liquid, a vertically movable seat for the bottom edge of said cover, and means to cause said seat to emerge from the liquid before the cover lifts from the seat.

10. In a gas relief valve, an upright gas conduit, a body of liquid surrounding the lower end of the conduit, a vertically movable valve member enclosing the upper end of the conduit and having sides which extend downwardly into said body of liquid, a vertically movable seat for the bottom edge of said cover, a float attached to said seat and adapted to raise it out of the liquid before the cover lifts from the seat.

11. A liquid sealed gas relief valve comprising a gas conduit surounded by a channel containing a suitable sealing liquid, a valve member depending into said liquid and closing said gas conduit, a seat for said valve member submerged in said liquid, and means for elevating both valve member and seat substantially above the surface of the liquid and separating the valve member from the seat when the pressure in the gas conduit exceeds the desired maximum.

Signed this 28th day of February, 1930, at Chicago, county of Cook, State of Illinois.

HAROLD V. ATWELL.